US006345044B1

United States Patent
Edgar, III et al.

(10) Patent No.: US 6,345,044 B1
(45) Date of Patent: Feb. 5, 2002

(54) APPARATUS AND METHOD FOR ADDRESS ASSIGNMENTS FOR SATELLITE TELEPHONE

(75) Inventors: Clement B. Edgar, III, San Diego, CA (US); R. Nicholson Gibson, Boulder, CO (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 09/201,577

(22) Filed: Nov. 30, 1998

(51) Int. Cl.$^7$ ................................................ H04Q 7/24
(52) U.S. Cl. ...................... 370/338; 370/340; 370/475
(58) Field of Search ................................ 370/310, 315, 370/316, 328, 329, 338, 340, 341, 445, 447, 448, 475

(56) References Cited

U.S. PATENT DOCUMENTS

| 5,276,442 A | * | 1/1994 | Cree et al. ............. 340/825.52 |
| 5,353,287 A | * | 10/1994 | Kuddes et al. .............. 370/435 |
| 5,519,706 A | * | 5/1996 | Bantz et al. ................ 370/448 |
| 5,708,831 A | | 1/1998 | Sechon |
| 5,835,723 A | * | 11/1998 | Andrews et al. ............ 709/226 |
| 5,841,778 A | * | 11/1998 | Shaffer et al. .............. 370/447 |
| 6,118,771 A | * | 9/2000 | Tajika et al. ................ 370/328 |

* cited by examiner

Primary Examiner—David R. Vincent
Assistant Examiner—Bob A. Phunkulh
(74) Attorney, Agent, or Firm—Philip R. Wadsworth; Gregory D. Ogrod

(57) ABSTRACT

A system and a method for address assignments for wireless satellite telephone systems comprises one or more desksets (telephones) and a radio antenna unit (RAU). The desksets are connected to the RAU using an interface bus. In operation, a deskset initiates an address arbitration cycle by transmitting a request for an address to the RAU. The RAU acknowledges after it receives the request, and queries other desksets if the requested address is being used by other desksets. If no other deskset responds within a predetermined time period, the RAU grants the requesting deskset the address. If the requested address is being used, the deskset using the address informs the RAU, and the RAU rejects the request. The requesting deskset then requests a different address. If all available addresses are being used, the requesting deskset informs the user and shuts down. If two or more desksets transmit requests concurrently, there will be a collision. To resolve a collision, the desksets are divided into two sets. Desksets with a 0 in the least significant bit (LSB) of their electronic serial number (ESN) will be in a first, and the desksets with a 1 in the LSB of their ESN will be in the second set. The desksets in the first set transmit after 100 ms. The desksets in the second set transmit after an additional 10 ms (110 ms total).

36 Claims, 10 Drawing Sheets

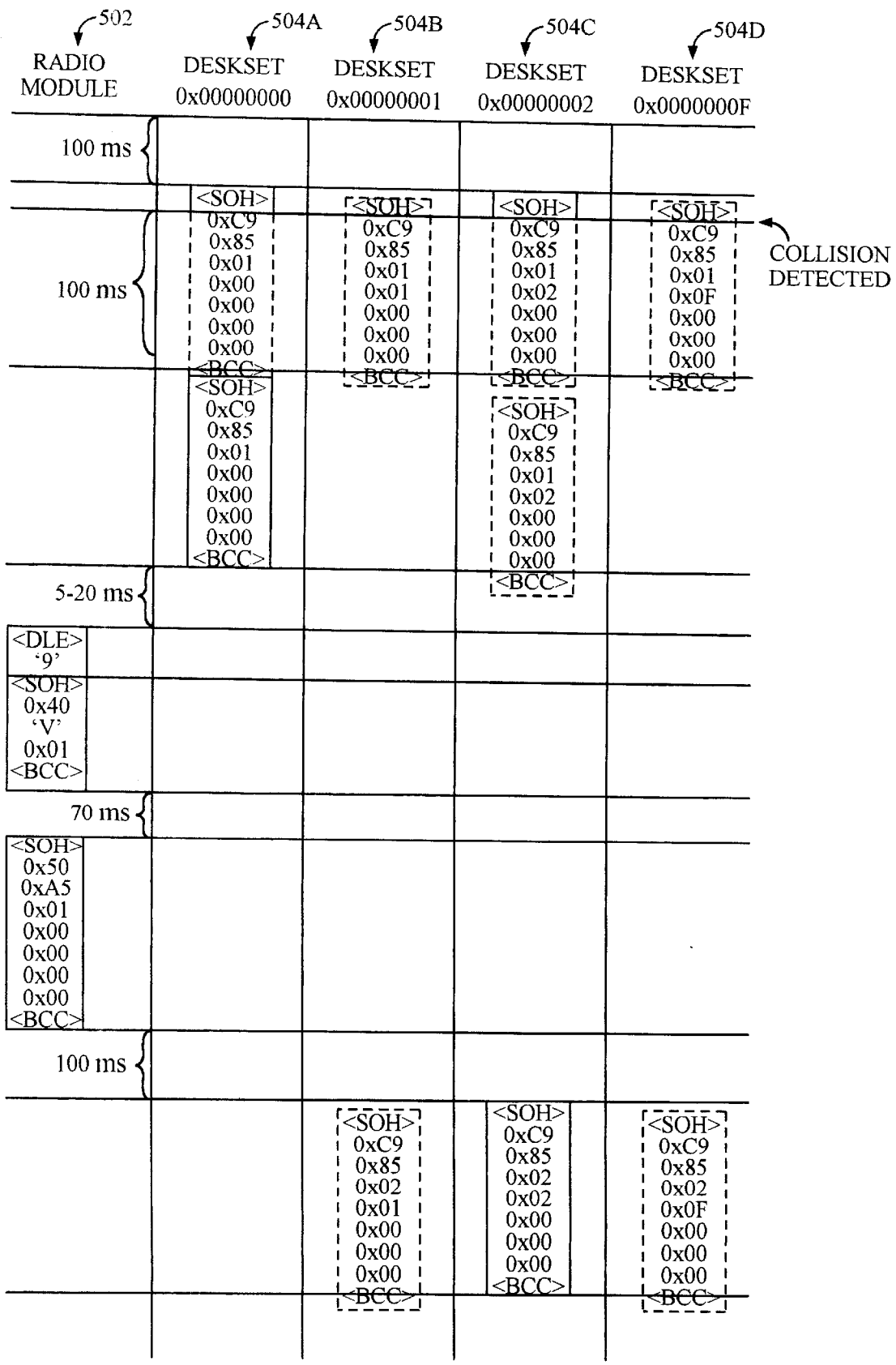
CONTINUED ON NEXT PAGE
FIG. 5A

| | 502 RADIO MODULE | 504A DESKSET 0x00000000 | 504B DESKSET 0x00000001 | 504C DESKSET 0x00000002 | 504D DESKSET 0x0000000F |
|---|---|---|---|---|---|
| | CONTINUED FROM PREVIOUS PAGE | | | | |
| 5-20 ms | <DLE> '9' <SOH> 0x60 'V' 0x02 <BCC> | | | | |
| 70 ms | | | | | |
| | <SOH> 0x70 0xA5 0x02 0x02 0x00 0x00 0x00 <BCC> | | | | |
| 110 ms | | | | | |
| | | | <SOH> 0xC9 0x85 0x03 0x01 0x00 0x00 0x00 <BCC> | | <SOH> 0xC9 0x85 0x03 0x0F 0x00 0x00 0x00 <BCC> ← COLLISION DETECTED |
| 0.6 ms | | | | | |
| | | <SOH> 0xC1 <NAK> 0x03 <BCC> | | | |
| 5-20 ms | | | | | |
| | <SOH> 0x70 0xA5 0x02 0x02 0x00 0x00 0x00 <BCC> | | | | |
| 100 ms | | | | | |
| | CONTINUED ON NEXT PAGE | | | | |

FIG. 5B

| 502<br>RADIO<br>MODULE | 504A<br>DESKSET<br>0x00000000 | 504B<br>DESKSET<br>0x00000001 | 504C<br>DESKSET<br>0x00000002 | 504D<br>DESKSET<br>0x0000000F |
|---|---|---|---|---|
| | CONTINUED FROM PREVIOUS PAGE | | | |
| | | \<SOH\><br>0xC9<br>0x85<br>0x03<br>0x01<br>0x00<br>0x00<br>0x00<br>\<BCC\> | | \<SOH\><br>0xC9<br>0x85<br>0x03<br>0x0F<br>0x00<br>0x00<br>0x00<br>\<BCC\> |
| 5-20 ms { | | | | |
| \<DLE\><br>'9'<br>\<SOH\><br>0x40<br>'V'<br>0x03<br>\<BCC\> | | | | |
| 70 ms { | | | | |
| \<SOH\><br>0x50<br>0xA5<br>0x03<br>0x01<br>0x00<br>0x00<br>0x00<br>\<BCC\> | | | | |
| 110 ms { | | | | |
| | | | | \<SOH\><br>0xC9<br>0x85<br>0x04<br>0x0F<br>0x00<br>0x00<br>0x00<br>\<BCC\> |
| 5-20 ms { | | | | |
| \<DLE\><br>'9'<br>\<SOH\><br>0x60<br>'V'<br>0x04<br>\<BCC\> | | | | |

CONTINUED ON NEXT PAGE     FIG. 5C

APPARATUS AND METHOD FOR ADDRESS ASSIGNMENTS FOR SATELLITE TELEPHONE

BACKGROUND OF THE INVENTION

I. Field of the Invention

The present invention relates generally to multi-access communication systems. More specifically, the present invention relates to an apparatus and a method for address assignments for multiple telephone sets in satellite telephone systems.

II. Description of the Related Art

Many communication systems, such as satellite systems, multidrop telephone lines, and multitap bus systems use multi-access communication system configurations. Generally, in a multi-access communication system, a plurality of nodes are connected to a single multi-access channel or an interface bus. Each node has a queue of packets, representing data to be transmitted over or by the interface bus. The interface bus views all waiting packets as one combined queue to be served by an appropriate protocol.

Several methods for access to an interface bus have been developed for multi-access communication systems. One method is the "free-for-all" method in which nodes normally send new packets immediately, hoping for no interference from other nodes. The problem, however, is that packets need to be retransmitted when collisions, that is, interference, occur. The other method is the "perfectly scheduled" method in which there is some order in which nodes are allocated reserved time intervals for interface bus access.

Multi-access channels are being considered for interfacing the components of various satellite telephone systems currently under development. For example, multi-access channels are being considered for providing service for fixed user terminal (UT) systems planned for use in some satellite communication systems. A fixed UT, also called a mobile station, subscriber unit, or a communication terminal, can be a telephone, a wireless unit or a fixed station. The fixed UT is designed to operate from a fixed location. Generally, the fixed UT includes a radio antenna unit (RAU) and one or more telephone sets (also called desksets) connected to the RAU.

A remote location with party line service can be efficiently linked to a satellite or other wireless communications system through a radio antenna unit (RAU). An RAU is a transceiver, comprising well known elements, that transmits and receives a modulated carrier signal to and from the satellite communications system through an antenna. The RAU generally includes a receiver, a transmitter and other signal processing circuitry required for wireless operations. The RAU provides receive and transmit capabilities for one or more telephone sets. During transmission, the RAU accepts audio signals from the multiple phones. An audio coder-decoder (or audio codec) in the RAU digitizes the audio signals, which are then used to modulate the carrier signal that is radiated to a satellite (or other relay apparatus) by the antenna. During reception, the RAU receives an input signal comprising a modulated carrier signal from a satellite. The RAU demodulates the input signal to retrieve the digital audio signal. After which, the audio codec converts the digital audio signal to an analog audio signal, and causes the analog audio signal to be sent to the multiple phones. The RAU can use a variety of additional signal processing and control elements as desired, and known in the art.

There are various advantages associated with the fixed UT. The fixed UT is relatively inexpensive to implement. The fixed UT appears to be especially suitable at remote locations, such as oil rigs, isolated rural areas, and the like where it may not be economically feasible to link such remote areas by land lines.

The fixed UT also appears to be suitable in areas where a typical wireless local loop may not be economically feasible. In a wireless local loop, multiple cellular telephones communicate using a base station (cell site or station). The base station is connected to a public switched telephone network (PSTN) through land lines. However, in some areas, there may not be enough wireless telephone users to justify the installation of a base station. There may also be a lack of sufficient public telephone network infrastructure. For those areas, a fixed UT with a single RAU being serviced by a satellite system or fixed relay stations is a preferred alternative.

The practical implementation of the fixed UT, however, still presents numerous challenges. What is needed is a suitable interface bus (i.e., the multi-access channel) so that the RAU can be connected to multiple desksets. Also, there is a need for a method that will enable the desksets to share the interface bus and to prevent a collision in the interface bus when a plurality of desksets transmit packets simultaneously. Also, there is a need for a method for assigning an address number to each deskset so that it can receive and transmit packets of information.

SUMMARY OF THE INVENTION

The present invention is directed to an apparatus and a method for assigning addresses to terminals in fixed UT systems that include a common node, such as a radio antenna unit (RAU), and one or more desksets, such as telephones. The desksets are connected to the RAU through an interface bus.

In one aspect, the method includes the steps of transmitting a request for a first address from one of the terminals to the common node, determining whether or not the first address is in use by any other terminal, transmitting an address grant packet from the common node to the one of the terminals when no other terminal is using the first address, or transmitting an address reject packet from the common node to the one of the terminals when another terminal is already using the first address, and transmitting a request for a second address from the one of the terminals to the common node when an address reject packet is received.

In another aspect, the method includes the steps of transmitting, from one of the plurality of terminals, a request for an address, detecting a collision on the interface bus when another of the plurality of terminals concurrently transmits a request for an address, and retransmitting, from the one of the plurality of terminals, the request for an address after a time-out period has elapsed.

BRIEF DESCRIPTION OF THE DRAWINGS

The present invention will be described with reference to the accompanying drawings. In the drawings, like reference numbers generally indicate identical, functionally similar, and/or structurally similar elements. The drawing in which an element first appears is indicated by the leftmost digit(s) in its reference number.

FIGS. 5A–5D illustrate an example of an address arbitration process in accordance with one embodiment of the present invention.

DETAILED DESCRIPTION OF THE PREFERRED EMBODIMENTS

Figure 1:
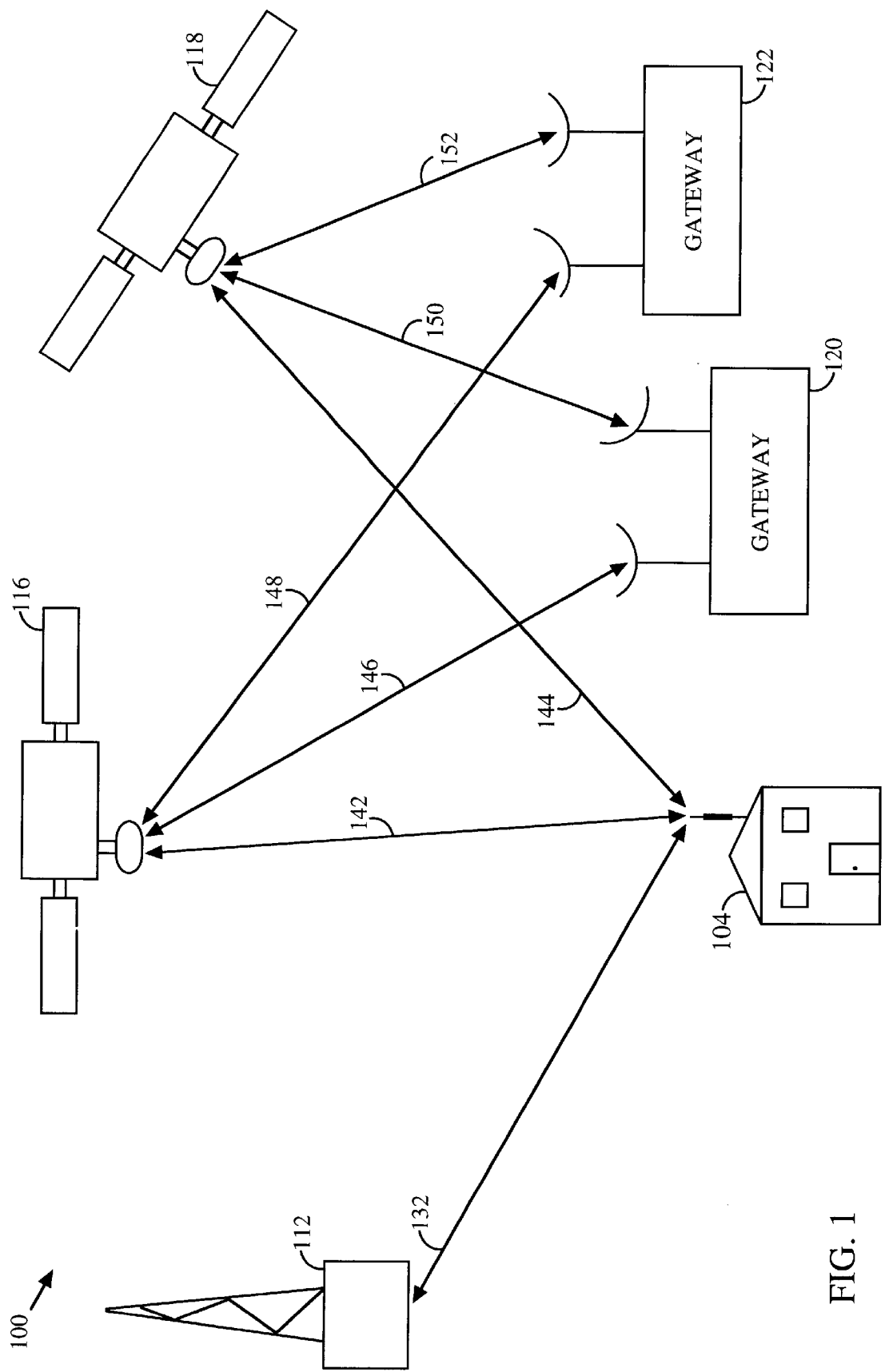
FIG. 1 illustrates an exemplary environment in which the present invention operates.

An exemplary wireless communication system in which the present invention is useful is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways 120A and 120B are shown for effecting communication with a fixed remote user terminal (UT) 104. Typically, the base stations and satellites/gateways are components of separate communication systems, referred to as being terrestrial and satellite based, although, this is not necessary. The total number of base stations, gateways, and satellites in such systems depend on desired system capacity and other factors well understood in the art. UT 104 comprises a wireless communication device such as, but not limited to, a cellular telephone, a data transceiver, or a paging or position determination receiver, and can be hand-held or vehicle mounted as desired.

In FIG. 1, some possible signal paths are illustrated for communication being established between UT 104 and base station 112, or through satellites 116 and 118, with gateways 120A and 120B. The base station-user terminal communication links are illustrated by line 132. The satellite-user terminal communication links between satellites 116 and 118 and UT 104 are illustrated by lines 142 and 144. The gateway-satellite communication links between gateways 120A and 120B and satellites 116 and 118 are illustrated by lines 146, 150, and 152. Gateways 120A and 120B, and base station 112, may be used as part of one or two-way communication systems or simply to transfer messages or data to UT 104.

Figure 2:
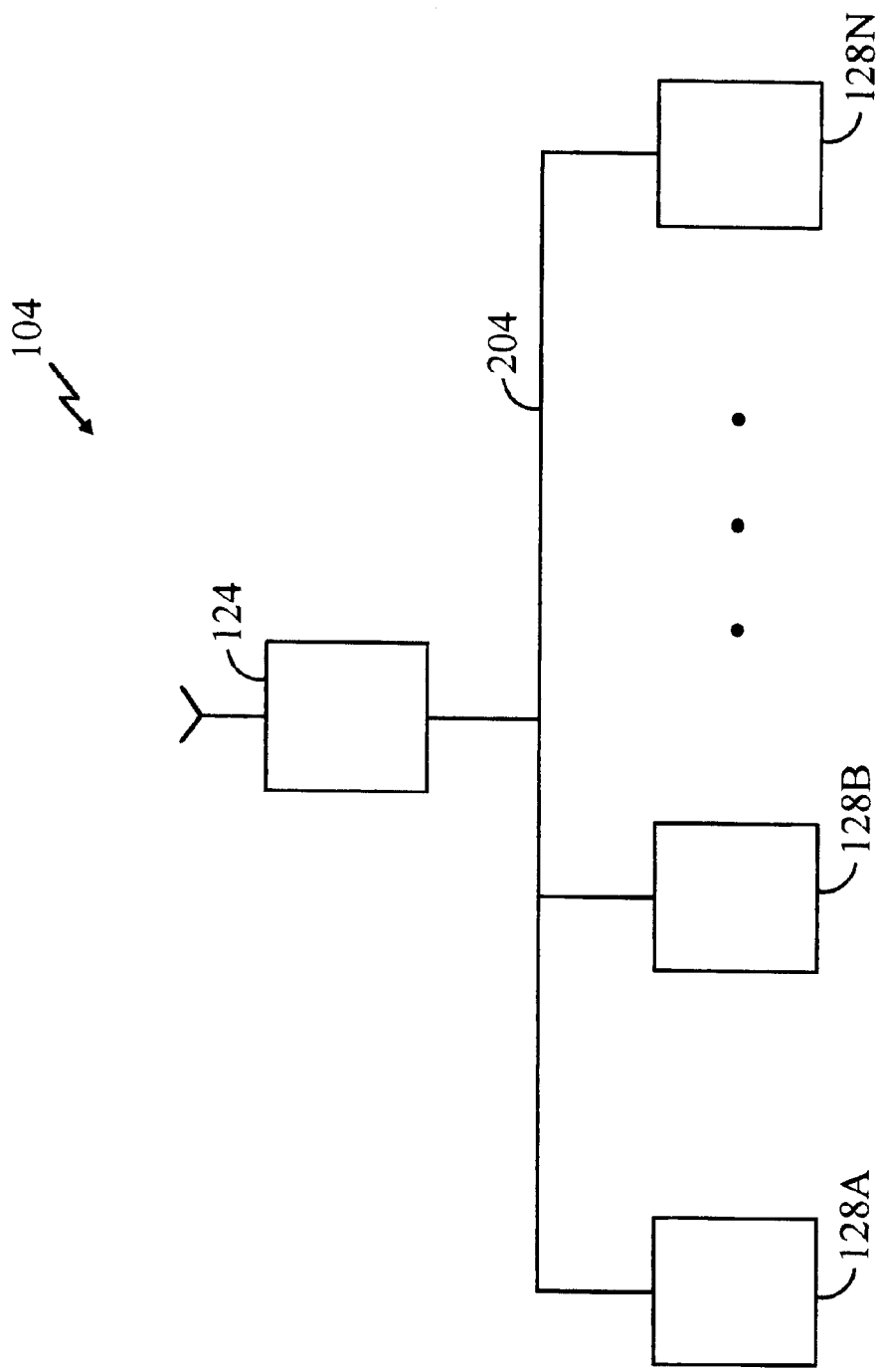
FIG. 2 is a system level diagram according to one embodiment of the present invention.

FIG. 2 is a system level diagram of a fixed UT 104 according to one embodiment of the present invention. In UT 104, an interface bus 204 connects a plurality of desksets 128a–128n to RAU 124. In operation, desksets 128 communicate over interface bus 204.

Figure 3:
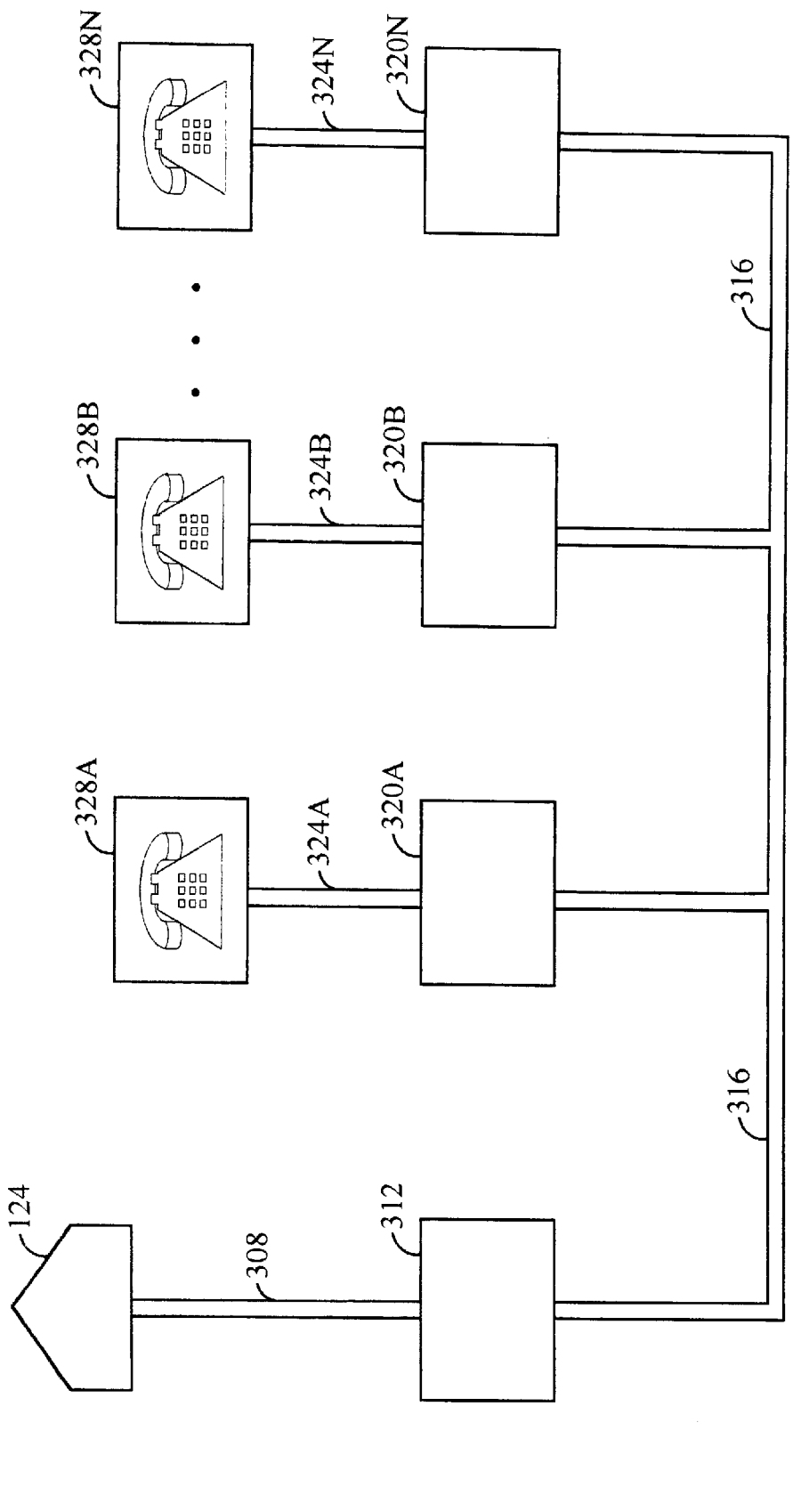
FIG. 3 illustrates a fixed UT system according to one embodiment of the present invention.

FIG. 3 illustrates a fixed UT system 300 according to one embodiment. Fixed UT system 300 comprises a RAU 124, a shielded cable 308, a junction box (or a building entry panel) 312, an electronic industries association (EIA) 568 unshielded twisted pair (UTP) cable 316 (also referred to as a first UTP 316), one or more RJ-45 telephone jacks 320a, b, . . . n, one or more four pair RJ-45 telephone cords (also referred to as a second UTP 324a, b, . . . n), and one or more desksets 328a, b, . . . n. It should be understood that components, such as EIA 568 cables, RJ-45 jacks and building entry panels, can be easily substituted with alternative components. For example, EIA 568 UTP cable can be substituted with other unshielded cables that are well known in the industry. Likewise, RJ-45 telephone jacks can be substituted with other types of jacks that are widely available.

In one embodiment, fixed UT system 300 operates on 12 volt DC power. Fixed power. RAU 124 can be installed on a suitable support surface or object such as, but not limited to, a roof or pole, as is known. Junction box 312 can be installed nearby in a sheltered, but still outdoor environment. Desksets 328 can be located indoors to protect them from weather.

In one embodiment, shielded cable 308 (18 wires) connects RAU 124 to junction box 312. Shielded cable 308 comprises a deskset interface (8 wires), a data interface (8 wires) and a radio power interface (2 wires). The deskset interface in turn comprises a control interface (2 wires), an audio interface (2 wires) and a power interface (2 wires). It will become apparent to one skilled in the art that other variations of the deskset interface, the data interface and the radio power interface can also be used. For example, other numbers of conductors may be employed in certain applications.

Second UTP 324 (8 wires) and RJ-45 telephone jacks 320 connect one or more desksets 328 to RAU 124. According to one embodiment, up to 8 desksets can be connected to junction box 312. It should be understood, however, that the present invention can easily be configured to support a higher or lower number of desksets.

Tables I, II and III below list some of the components shown in FIG. 3 according to one embodiment. Other components can be substituted for the listed components without departing from the spirit and scope of the present invention. Specifically, Table I lists constituent parts of shielded cable 308. Table II lists constituent parts of the deskset interface listed in Table I. Table III lists constituent parts of UTP cable 324.

TABLE I

| Shielded Cable | |
|---|---|
| deskset interface | 8 wires |
| data interface | 8 wires |
| radio power interface | 2 wires |

TABLE II

| Deskset Interface | |
|---|---|
| control interface | 2 wires |
| audio interface | 4 wires |
| power interface | 2 wires |

TABLE III

| UTP Cable | |
|---|---|
| control interface | 2 wires |
| audio interface | 4 wires |
| power interface | 2 wires |

Figure 4:
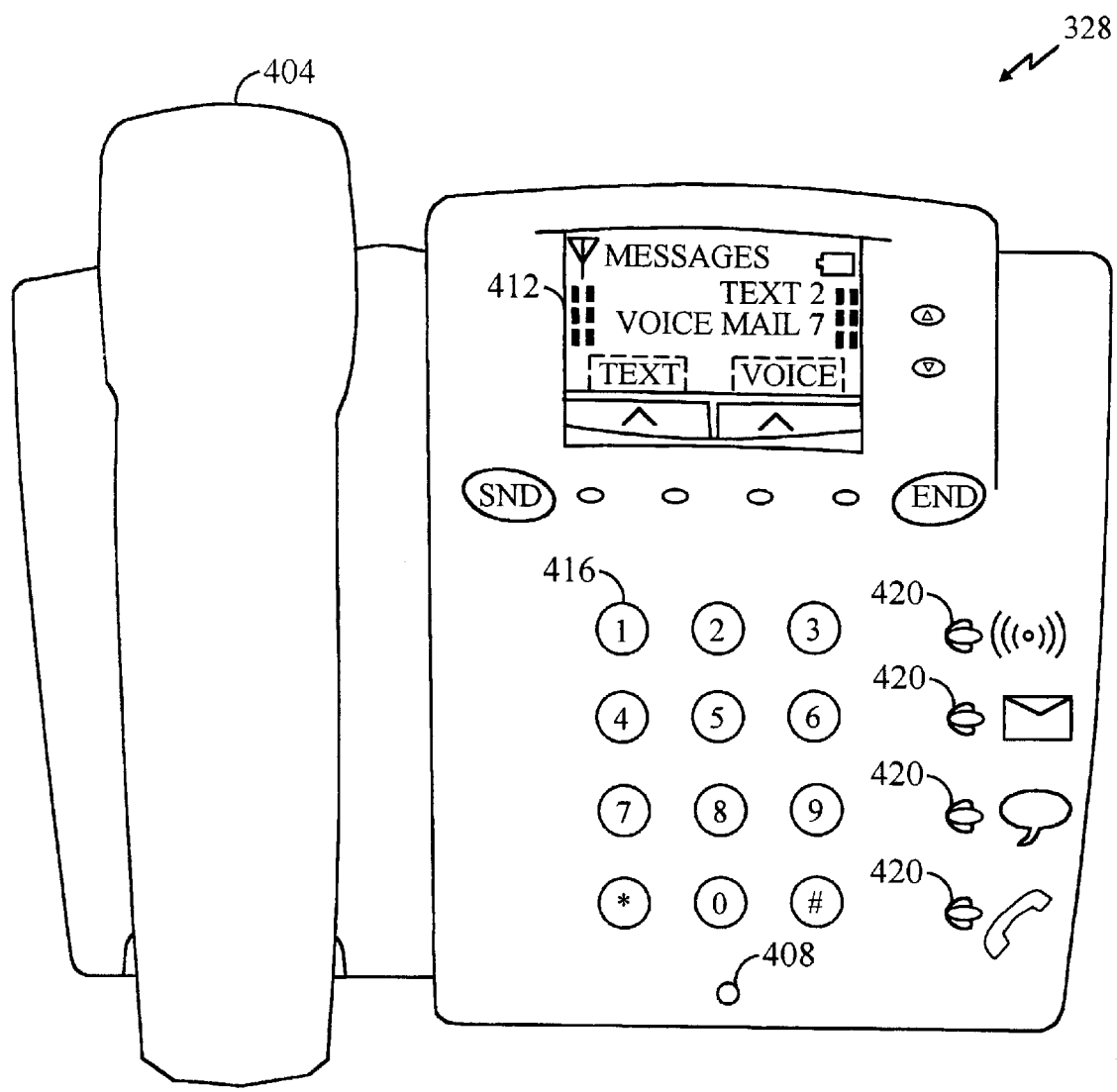
FIG. 4 illustrates a deskset according to one embodiment of the present invention.

FIG. 4 shows a deskset 328 according to one embodiment of the present invention. Deskset 328 represents a users primary interface with the satellite telecommunications system. Deskset 328 comprises a handset 404, a ringer/speaker 408, which is also typically located on the handset or in the cradle, a multi-line liquid crystal display (LCD) 412, here four-line, a keypad 416, and light emitting diodes (LEDs) 420. LCD 412 and keypad 416 are used to access and control the special features of the satellite telecommunications system. LEDs 420 indicate telephone mode and status of deskset 328. It should be understood, however, that other types of desksets can also be used in the present invention.

In one embodiment, deskset 328 includes a processing element. In one embodiment, the processing element includes a microcontroller and a 2 wire EIA-485 based interface to an x86 type microprocessor in RAU 124. An exemplary processor is a 386 microprocessor which is commercially available from Intel in various mounting packages or forms, however, other types of processors may be used, as would be known by those skilled in the art. The processing element takes commands and data from RAU 124 and lights the LEDs, outputs commands and data to the LCD and controls audio components. Also, deskset 328 scans the keypad and reports key state changes to RAU 124. Deskset 328 also performs diagnostics and reports errors to RAU 124.

In operation, RAU 124 sends commands and data in packets to one or more desksets 328a–n. Likewise, desksets 328a–n send commands and data in packets to RAU 124. Note that desksets 328a–n do not send packets to other desksets 328a–n. More specifically, RAU 124 sends high level commands and LCD data to one or more desksets 328. Desksets 328-n send button and error data and negative acknowledgment (NAK) packets to RAU 124. The packets exchanged by the desksets and RAU are summarized in Table IV.

TABLE IV

| Packet Type | Code | Argument |
| --- | --- | --- |
| Address Request | 0 × 85 | Desired Address + 4-byte ESN |
| Address Verify | "v" (ASCII 0 × 76) | Desired Address |
| Address Grant | 0 × A5 | Desired Address + 4-byte ESN |
| Address In Use | "u" (ASCII 0 × 75) | Desired Address |
| Address Reject | "j" (ASCII 0 × 6A) | Desired Address |
| NAK | 0 × 15 | SQN of last packet received |
| Reboot | "R" (ASCII 0 × 52) | "b" (ASCII 0 × 62) |

Each deskset 328a–n requires an address number so that RAU 124 can send packets to individual desksets. Also, an address number allows RAU 124 to identify a source deskset when RAU 124 receives a packet. Furthermore, address numbers allow the system to avoid collisions in the event multiple desksets transmit packets simultaneously.

As stated before, multiple desksets can be connected to RAU 124. Each deskset is assigned an address number during power-up or initialization. An address arbitration algorithm or process is utilized to assign an address to each deskset 328a–n. The address arbitration process makes use of a unique electronic serial number (ESN) stored in each deskset 328a–n.

At power-up, a deskset 328a–n initiates an address arbitration processing cycle by transmitting a request for an address and its ESN to RAU 124. RAU 124 acknowledges the request and polls other desksets 328a–n to determine whether or not the requested address is being used by other desksets 328. If no deskset responds within a predetermined time period, RAU 124 grants the requesting deskset the address. In one embodiment, the predetermined time period is 70 ms. However, other time periods may be used according to factors known in the art.

If the requested address is being used, the deskset using that address informs RAU 124, and RAU 124 rejects the requesting deskset's request. The requesting deskset then requests a different address. If all available addresses are being used, the requesting deskset informs the user, using either visual or audio feedback signals, and shuts down.

The following is a detailed description of the address arbitration process according to one embodiment. As stated before, a plurality of desksets 328a–n can be connected to RAU 124. Thus, there can be a scenario where only a single deskset 328 requests an address at any instant of time. Also, there can be a scenario where multiple desksets 328a–n all concurrently competing for an address.

First, consider the scenario where only one deskset requests or arbitrates for an address. According to the present invention, following power-up, deskset 328 waits for a predetermined time period (known as an idle time) before transmitting a request for an address on the interface bus. The idle time allows a deskset to ensure that the interface bus is idle and, thus, the interface bus can be accessed. Also, the idle time prevents multiple desksets from transmitting their requests concurrently. In one embodiment, deskset 328 waits either 100 or 110 ms, based on the least significant bit of the ESN assigned to that deskset. Then, deskset 328 transmits a request for an address, here labeled as address #1. Deskset 328 includes the appropriate built in or preassigned ESN with the request.

If RAU 124 receives the request, it acknowledges the request. Otherwise, deskset 328 again waits for a quiet bus, with an idle time based on an ESN bit, and then transmits its request. If the request gets through, RAU 124 queries the other desksets 328 to determine whether they object to granting address #1. RAU 124 does this by sending an "address verify" packet to those desksets. If another deskset 328 is using address #1, that deskset 328 sends RAU 124 an "address in use" packet. RAU 124 then rejects the request for address #1. The deskset 328 that is arbitrating for an address then requests another address, here labeled as address #2. RAU 124 again acknowledges the request and proceeds through the same query process to determine whether or not the address is being used by other desksets 328. If there is no response to the "address verify" packet for a predetermined period (at least 70 ms in a preferred embodiment), RAU 124 assumes that the address is not being used and grants address #2. The ESN of deskset 328 being assigned the address is included in the grant packet to ensure that only one deskset 328 is assigned address #2.

Now, consider the scenario where multiple desksets 328 arbitrate for addresses simultaneously. In this scenario, the ESN of each individual deskset is used to generate a timeout value for that deskset. Following power-up, desksets 328 will be ready to transmit at substantially the same time. If more than one deskset 328 transmits a request simultaneously, there will be a collision.

In order to resolve a collision, desksets 328a, b, ... n are divided into two sets. Desksets with a '0' in the least significant bit (LSB) of their ESN are assigned to a first set which is referred to as the left hand set (LHS). Desksets with a '1' in the LSB of their ESN are assigned to a second set which is referred to as the right hand set (RHS). However, other notations or designations can be used to label the sets, with these labels being used for clarity. Desksets in the LHS transmit 100 ms after a collision. Desksets in the RHS wait an additional 10 ms (110 ms total) and then transmit their requests. Thus, desksets in the RHS always wait longer than desksets in the LHS. However, it will be cleared to those skilled in the art that not only can other lengths of time be used for each set, but the relative length of time as between the two sets can also be reversed as desired.

If there is more than one deskset in the LHS, there will be a collision. In this case, desksets in the LHS are divided again according to the next least significant bit in the ESN of each desksets. The desksets having '0' in that bit position remain assigned to the LHS and the desksets having '1' in that bit position are re-assigned to the RHS. This process continues until there is only one deskset in the LHS that transmits a packet to request an address.

If a packet was sent during a time slot allocated to the LHS without a collision, an address is eventually assigned to the deskset. The desksets in the RHS wait for the address grant, increment their address counters, and move toward the front of a queue. The desksets in the RHS are then re-grouped according to the LSB of each of their respective ESNS. The process then begins again from the beginning. If there was no packet sent during the time slot allocated to the LHS, the desksets in the RHS can transmit a predetermined amount of time (110 ms in a preferred embodiment) after the last character on the interface bus was detected.

Figure 5D:
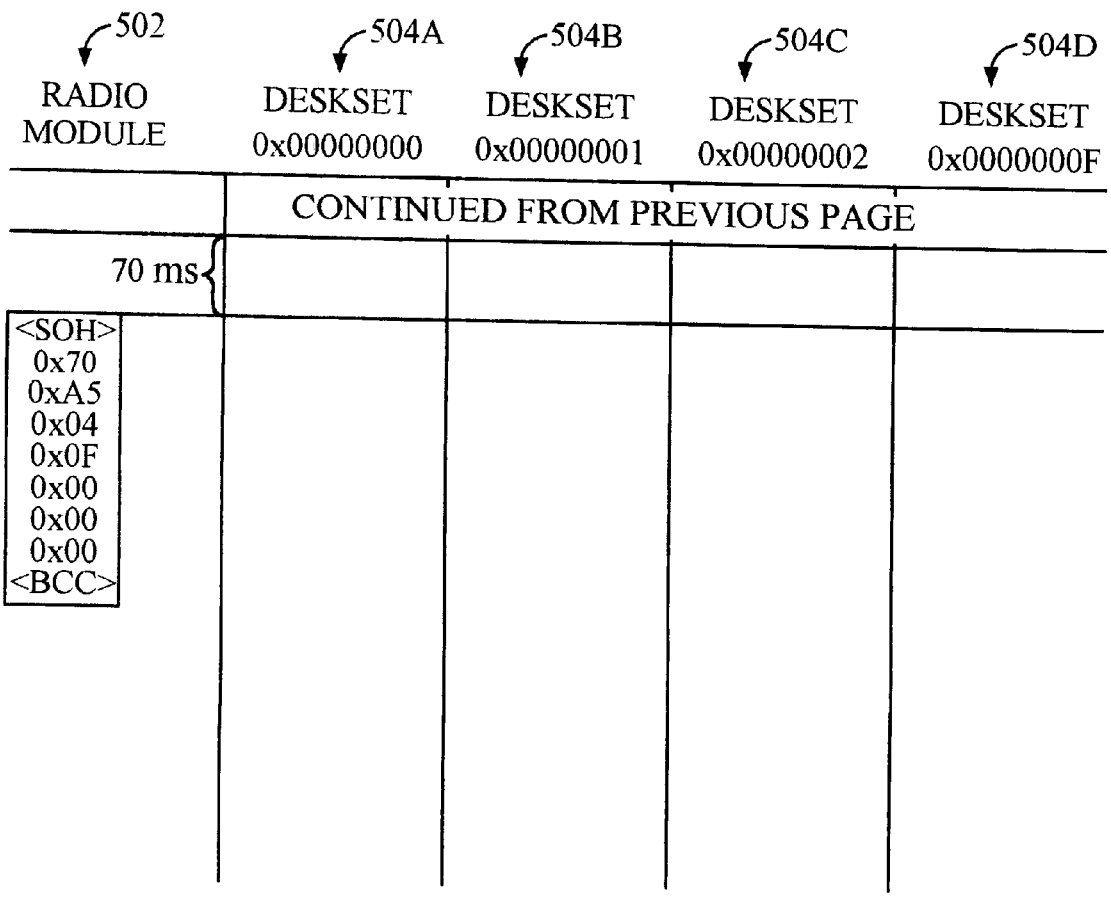

FIGS. 5A–5D illustrate an example of an address arbitration process. Each FIG. includes five columns, in which time progresses down the column. Column 502 indicates the address transfer status of the RAU, at a given point in time. Each of the remaining four columns 504a, 504b, 504c, 504d indicates the address transfer status of a deskset, at a given point in time. In FIG. 5A, four desksets arbitrate for addresses after power-up. The desksets have ESNs 0000, 0001, 0010 and 1111, respectively. Each deskset is listed at the top of a column in FIG. 5A.

Initially, the four desksets are divided into two sets based on the LSB of their ESNs. The desksets having ESNs 0000 and 0010 are assigned to the LHS in columns 504a and 504c. The desksets having ESNs 0001 and 1111 are assigned to the RHS in columns 504b and 504d. The desksets in the LHS transmit after 100 ms, while the desksets in the RHS do not transmit yet. In FIG. 5A, a collision is detected between the two LHS desksets. The desksets involved in the collision abort their respective transmissions.

The desksets in the LHS are re-grouped according to the next LSB of their ESNs. Deskset 0000 is assigned again to the LHS, but deskset 0010 is assigned to the RHS. Now only deskset 0000 is in the LHS. Deskset 0000 transmits its packet, and the packet is acknowledged by RAU 104. RAU 104 transmits an "address verify" packet to verify that no other desksets have address #1. Since there are no other desksets having address #1, no deskset responds with an "address in use" packet. After 70 ms, RAU 104 assumes address #1 is available, and grants address #1 to deskset 0000.

After deskset 0000 is granted address #1, all other desksets waiting for an address increment their address counters and regroup into sets based on the LSB of their ESNs. Now deskset 0010 is alone in the LHS, and it transmits its request. This request is acknowledged, verified, and granted by RAU 124.

Referring again to FIGS. 5A–5D, desksets 0001 and wait for address #3 and collide. Deskset 0000 receives an erroneous packet as the result of the collision. So, deskset 0000 sends a negative acknowledgment (NAK). Deskset 0010 also notices the erroneous packet, but it does not send a NAK, since deskset 0000 has already sent a NAK. RAU 124 receives the NAK and resends the last packet. Since desksets 0001 and 1111 are not looking for address 2, and since they have already received packet sequence number (SQN) 3, they do not increment their address counters. They are instead re-assigned to the LHS and RHS based on the next least significant bit of the ESN. Deskset 0001 ends up in the LHS and gets an address. Finally, deskset 1111 gets its request in and is granted an address.

Figure 6:
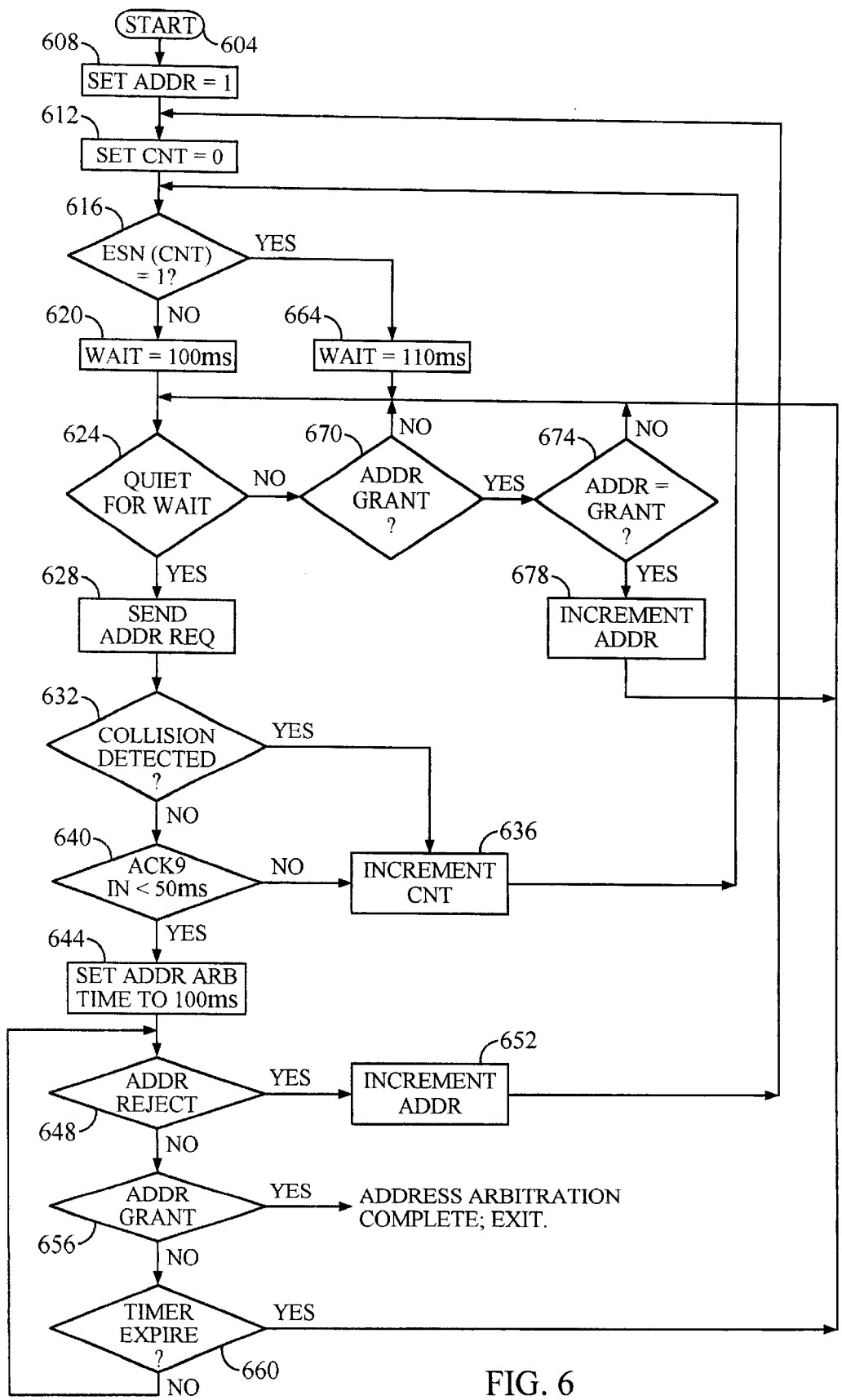
FIG. 6 is a flow diagram of an address arbitration process for a deskset.

FIG. 6 is a flow diagram of a startup and address arbitration process for a deskset. In step 604, the deskset is powered up and begins arbitrating for an address. In step 608, the deskset sets address (ADDR)=1, i.e., the desired address as being address #1. In step 612, the deskset sets count (CNT) index of the ESN, i.e., ESN(CNT), to 0. In step 616, the deskset determines if the ESN(CNT)=1. If the ESN(CNT) is not equal to 1, the process moves to step 620 where the deskset waits for the bus to be idle (that is, quiet, no packets being transferred); in a preferred embodiment, the wait is at least 100 ms. In step 624, the deskset determines if the bus is available. If the bus is available, then in step 628, the deskset transmits a request for address #1.

Next, in step 632, the deskset determines whether there is a collision on the bus. If there is a collision, the process moves to step 636 where the deskset increments CNT. If there is no collision, the process moves to step 640 where it is determined if ACK N (an acknowledgment tacked with a tag N, where N is the address of the deskset or 9 if the deskset has no address) is<50 ms. If ACK N is<50 ms, the process moves to step 644 where an address arbitration timer is set to 100 ms. Next, in step 648, the deskset determines whether the address requested was rejected. If the address request was rejected, the process moves to step 652 where the address counter (ADDR) is incremented. If the address request was not rejected, the process moves to step 656 where the deskset determines whether the address request was granted. If the address request was granted, then the address arbitration process is complete. If the address request was not granted, the process moves to step 660 where the deskset determines whether the timer has expired. If the timer has expired, the process returns to step 624. If the timer has not expired, the process returns to the step 648.

If the ESN (CNT) is equal to 1 in step 616, the process moves to step 664 where the deskset waits for the bus to be quiet (for at least 110 ms in a preferred embodiment) and then returns to step 624. If the deskset determines that the bus is busy, the process moves to step 670 where the deskset determines if the address request is granted. If the address request is not granted, the process returns to step 624. If the address request is granted, the process moves to step 674 where the deskset determines if the address is equal to grant, i.e., ADDR=GRANT. If ADDR=GRANT, the process moves to step 678 where the address is incremented. If ADDR is not equal to GRANT, the process returns to step 624.

Figure 7:
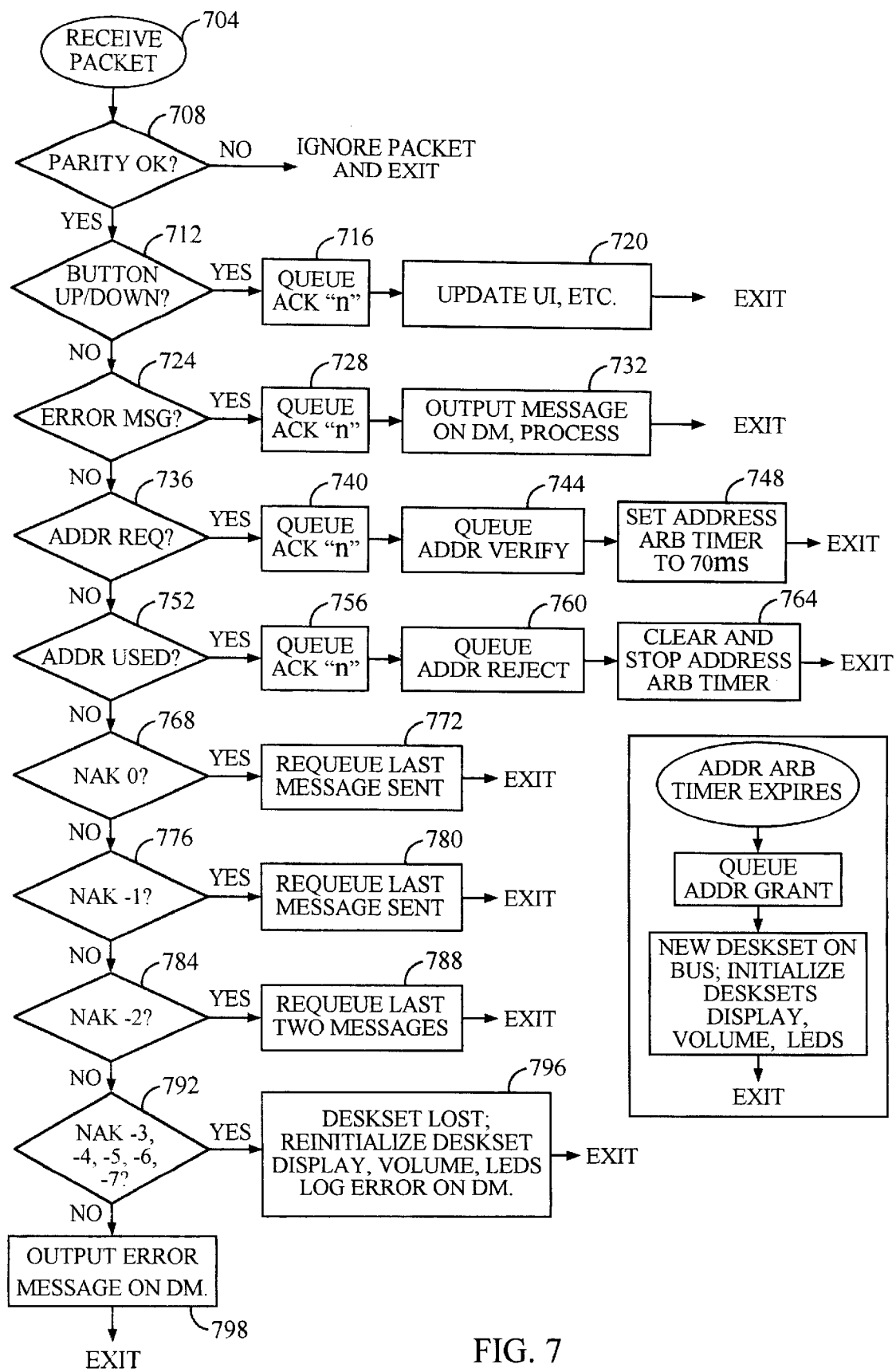
FIG. 7 is a flow diagram that illustrates how a radio antenna unit (RAU) receives and processes data packets.

FIG. 7 is a process diagram that illustrates how the RAU receives and processes packets. In step 704, RAU 124 receives a packet. In step 708, the RAU checks the parity of the packet received. If parity fails, the RAU ignores the packet. If parity passes, the process moves on to step 712 where the RAU determines the type of the packet. Types of packets include button packets, error packets, address request packets, address in use packets, etc. Button packets are sent from a deskset to the RAU to indicate that a button on its keypad of the deskset has been pressed. If button packets are detected, the process moves on to step 716 where the RAU acknowledges the packets, that is, ACK N is queued. Next, in step 720, the received packet is processed.

If button packets are not detected, the process moves on to step 724 where the RAU determines whether or not there are any error packets. If error packets are detected, the process moves on to step 728 where ACK N is queued. Next, in step 732, the message is outputted on a diagnostic monitor (DM) and processed.

If neither error packets nor button packets are detected, in step 736 the RAU determines whether an address has been requested, or not. If an address has been requested, the process moves on to step 740 where ACK N is queued. Next, in step 744, an address verify packet is queued. Next, in step 748, the address timer is set to 70 ms.

If the received packet is not an address request packet, the process moves to step 752 where the RAU determines whether the received packet is an "address in use" packet. An "address in use" packet is sent by a deskset in response to an "address verify" packet to indicate that the requested address has already been granted. If the address has already been granted, the process moves to step 756 where ACK N is queued. Next, in step 760, an address reject packet is queued. Next, in step 764, the address arbitration timer is stopped and reset.

Note that packets from the RAU include a sequence number (SQN). SQNs are used to keep track of the packets. The use of SQNs is described in detail in a commonly-owned, copending U.S. patent application entitled "Control Interface Protocol For Telephone Sets For A Satellite Telephone System," filed on even date herewith, having Ser. No. 09/732,805, still pending. Every deskset keeps track of the last valid SQN received, regardless whether the packet was addressed to that particular deskset, or not. If a deskset receives an erroneous packet, the deskset sends a NAK message. The NAK message includes the SQN of the last valid packet received from the RAU.

The RAU, upon receiving a NAK message transmits the last packet or the last few packets. For example, if the last packet transmitted by the RAU was packet #2, and the RAU receives a NAK 1, the RAU knows that the deskset has not yet received packet #2. The RAU, therefore, resends packet #2. If the last packet sent by the RAU was packet #3, but the RAU receives NAK 2, the RAU resends packets #2 and #3.

Referring back to FIG. 7, if the received packet is not a button, error, address request, or address in use packet, in steps 768, 776, 784, and 792 RAU 104 determines whether or not a NAK message has been received. A NAK message is a negative acknowledgment from a deskset and is tagged with the SQN of the last valid message received by that deskset. For this process, one is interested in the difference between the SQN of the last message sent by the RAU and the SQN of the last valid message received by a deskset. For purposes of discussion, a NAK message is labeled "NAK 0" when the argument of the NAK (that is, the SQN of the last valid packet received by the deskset) equals the SQN of the last packet sent. Similarly, a NAK packet is labeled NAK-1 if the argument is one less than the SQN of the of the last packet sent, a NAK packet is labeled NAK-2 if the argument is two less than the SQN of the of the last packet sent, and so on.

If NAK 0 has been received, the process moves to step 772 where the last packet sent is requeued. If NAK 0 has not been received, the process moves to step 776 where the RAU determines whether NAK 1 has been received. If NAK 1 has been received, the process moves to step 780 where the last packet sent is requeued. If NAK 1 has not been received, the process moves to step 784 where the RAU determines whether NAK 2 has been received. If NAK 2 has been received, the process moves to step 788 where the last two packets sent are requeued. If NAK 2 has not been received, the process moves to step 792 where the RAU determines whether or not NAK 3, 4, 5, 6 or 7 have been received. If NAK 3 (or higher) has been received, it indicates that the deskset did not receive the last three packets. In that case, the RAU resets the deskset that is lost, and that deskset starts from the beginning. Otherwise, the process moves to step 798 where an error message is outputted on DM.

While an embodiment of the present invention has been described above, it should be understood that it has been presented by way of example only, and not limitation. Thus, the breadth and scope of the present invention should not be limited by the above-described exemplary embodiment, but should be defined only in accordance with the following claims and their equivalents.

What we claim as the invention is:

1. In a communication system having a plurality of terminals connected to a common node by a digital interface bus, an apparatus for assigning address to the terminals, comprising:

means for transmitting a request for a first address from of the terminals to the common node;

means for determining whether said first address is in use by any other terminal;

means for transmitting an address grant packet from the common node to said one of the terminals when no other terminal is using said first address;

means for transmitting an address reject packet from the common node to said one of the terminals when another terminal is already using the first address;

means for transmitting a request for a second address from said one of the terminals to the common node when an address reject packet is received; and means for assigning to each of the plurality of terminals a time-out period, based on a division of said terminals into a plurality of sets.

2. The apparatus of claim 1, further comprising means for waiting for a predetermined time-out period prior to transmitting a request for an address on the interface bus.

3. The apparatus according to claim 2, wherein said predetermined time-out period is based on an electronic serial number of the terminal.

4. The apparatus according to claim 1, further comprising means for including an electronic serial number of the terminal with each request for an address.

5. The apparatus according to claim 1, wherein said means for determining comprises means for transmitting an address verify packet from the common node to the plurality of terminals.

6. The apparatus according to claim 5, wherein said means for determining further comprises means for transmitting an address in use packet from a given terminal to the common node when the address specified by said address verify packet is assigned to said given terminal.

7. The apparatus according to claim 1, further comprising means for including an electronic serial number of the terminal with said address grant packet.

8. The apparatus of claim 1, wherein the common node maintains a list of assigned addresses, wherein said means for determining comprises means for comparing said first address to the list of assigned addresses.

9. The apparatus of claim 1, further comprising means for incrementing said first address to produce said second address.

10. The apparatus of claim 1, wherein the common node includes a radio transceiver in one of a satellite communications system, a cellular communications system, and a wireless local loop communications system.

11. The apparatus of claim 1, wherein the common node is a device used to encode and decode voice data.

12. The apparatus of claim 11, wherein said voice data is carried by the digital interface bus.

13. The apparatus of claim 11, wherein said voice data is carried by a bus other than the digital interface bus.

14. In a communication system having a plurality of terminals connected to a common node via a digital interface bus, an apparatus for resolving bus collisions, comprising:
   means for transmitting, from one of the plurality of terminals, a request for an address;
   means for detecting a collision on the interface bus when another of the plurality of terminals concurrently transmits a request for an address;
   means for retransmitting, from said one of the plurality of terminals, said request for an address after a time-out period has elapsed; and
   means for assigning to each of the plurality of terminals a time-out period, based on a division of said terminals into a plurality of sets.

15. In a communication system having a plurality of terminals connected to a common node by a digital interface bus, a method for assigning addresses to the terminals, comprising the steps of:
   transmitting a request for a first address from one of the terminals to the common node;
   determining whether said first address is in use by any other terminal;
   transmitting an address grant packet from the common node to said one of the terminals when no other terminal is using said first address;
   transmitting an address reject packet from the common node to said one of the terminals when another terminal is already using the first address;
   transmitting a request for a second address from said one of the terminals to the common node when an address reject packet is received; and
   assigning to each of the plurality of terminals a time-out period, based on a division of said terminals into a plurality of sets.

16. The method of claim 15, further comprising the step of waiting for a predetermined time-out period prior to transmitting a request for an address on the interface bus.

17. The method according to claim 16, wherein said predetermined time-out period is based on an electronic serial number of the terminal.

18. The method according to claim 16, further comprising the step of including an electronic serial number of the terminal with each request for an address.

19. The method according to claim 15, wherein said determining step comprises the step of transmitting an address verify packet from the common node to the plurality of terminals.

20. The method according to claim 19, wherein said determining step further comprises the step of transmitting an address in use packet from a given terminal to the common node when the address specified by said address verify packet is assigned to said given terminal.

21. The method according to claim 15, further comprising the step of including an electronic serial number of the terminal with said address grant packet.

22. The method of claim 15, wherein the common node maintains a list of assigned addresses, wherein said determining step comprises the step of comparing said first address to the list of assigned addresses.

23. The method of claim 15, further comprising the step of incrementing said first address to produce said second address.

24. The method of claim 15, wherein the common node includes a radio transceiver in one of a satellite communications system, a cellular communications system, and a wireless local loop communications system.

25. The method of claim 15, wherein the common node is a device used to encode and decode voice data.

26. The method of claim 25, wherein said voice data is carried by the digital interface bus.

27. The method of claim 25, wherein said voice data is carried by a bus other than the digital interface bus.

28. In a communication system having a plurality of terminals connected to a common node via a digital interface bus, a method for resolving bus collisions, comprising the steps of:
   transmitting, from one of the plurality of terminals, a request for an address;
   detecting a collision on the interface bus when another of the plurality of terminals concurrently transmits a request for an address;
   retransmitting, from said one of the plurality of terminals, said request for an address after a time-out period has elapsed; and
   assigning to each of the plurality of terminals a time-out period, based on a division of said terminals into a plurality of sets.

29. In a communication system having a plurality of terminals connected to a common node via a digital interface bus, an apparatus for resolving bus collisions, comprising:
   means for transmitting, from one of the plurality of terminals, a request for an address;
   means for detecting a collision on the interface bus when another of the plurality of terminals concurrently transmits a request for an address;
   means for retransmitting, from said one of the plurality of terminals, said request for an address after a time-out period has elapsed;
   means for dividing the terminals into first and second sets;
   means for assigning a first time-out period to said terminals in said first set; and
   means for assigning a second time-out period to said terminals in said second set, wherein said first time-out period is shorter than said second time-out period.

30. The apparatus of claim 29, wherein said means for dividing comprises means for allocating terminals to said first and second sets based on the electronic serial numbers of said terminals.

31. The apparatus of claim 30, wherein said means for allocating comprises means for assigning a terminal to one of said first and second sets based on the least significant bit of its electronic serial number.

32. The apparatus of claim 31, further comprising:
   means for detecting a further collision;
   means for re-assigning each terminal in said first set to said first and second sets based on the next least significant bit of its electronic serial number;
   means for assigning said first time-out period to said terminals in said first set;
   means for assigning said second time-out period to said terminals in said second set; and
   means for retransmitting, from said one of the plurality of terminals, said request for an address after the time-out period assigned to said one of the plurality of terminals has elapsed.

33. In a communication system having a plurality of terminals connected to a common node via a digital interface bus, a method for resolving bus collisions, comprising the steps of:
   transmitting, from one of the plurality of terminals, a request for an address;

detecting a collision on the interface bus when another of the plurality of terminals concurrently transmits a request for an address;

retransmitting, from said one of the plurality of terminals, said request for an address after a time-out period has elapsed;

dividing the terminals into first and second sets;

assigning a first time-out period to said terminals in said first set; and assigning a second time-out period to said terminals in said second set, wherein said first time-out period is shorter than said second time-out period.

34. The method of claim 33, wherein said dividing step comprises the step of allocating terminals to said first and second sets based on the electronic serial numbers of said terminals.

35. The method of claim 34, wherein said allocating step comprises the steps of assigning a terminal to one of said first and second sets based on the least significant bit of its electronic serial number.

36. The method of claim 35, further comprising the steps of:

detecting a further collision;

re-assigning each terminal in said first set to said first and second sets based on the next least significant bit of its electronic serial number;

assigning said first time-out period to said terminals in said first set;

assigning said second time-out period to said terminals in said second set; and retransmitting, from said one of the plurality of terminals, said request for an address after the time-out period assigned to said one of the plurality of terminals has elapsed.

* * * * *